(12) United States Patent
Risch et al.

(10) Patent No.: US 9,346,140 B2
(45) Date of Patent: May 24, 2016

(54) ANVIL FOR ULTRASONIC MACHINING

(71) Applicant: MS Spaichingen GmbH, Spaichingen (DE)

(72) Inventors: Daniel Risch, Trossingen (DE); Elmar Noder, Boesingen (DE)

(73) Assignee: MS SPAICHINGEN GMBH, Spaichingen (DE)

( * ) Notice: Subject to any disclaimer, the term of this patent is extended or adjusted under 35 U.S.C. 154(b) by 555 days.

(21) Appl. No.: 13/721,675

(22) Filed: Dec. 20, 2012

(65) Prior Publication Data

US 2013/0161889 A1    Jun. 27, 2013

(30) Foreign Application Priority Data

Dec. 21, 2011   (DE) .................. 10 2011 121 830

(51) Int. Cl.
*B23Q 3/08* (2006.01)
*B23Q 3/00* (2006.01)
*B23K 20/10* (2006.01)
*B26D 7/20* (2006.01)
(Continued)

(52) U.S. Cl.
CPC . *B23Q 3/00* (2013.01); *B23K 20/10* (2013.01); *B23K 20/103* (2013.01); *B26D 7/20* (2013.01); *B29C 65/08* (2013.01); *B29C 65/086* (2013.01); *B29C 65/7443* (2013.01); *B29C 66/41* (2013.01); *B29C 66/816* (2013.01); *B29C 66/8167* (2013.01); *B29C 66/8244* (2013.01); *F16C 32/0402* (2013.01); *F16C 32/0427* (2013.01); *F16C 32/0603* (2013.01)

(58) Field of Classification Search
CPC .............. B23Q 3/00; B23Q 3/15; B23Q 1/38; B26D 7/20; B23K 20/10; B23K 20/103; B29C 66/8167; B29C 66/8244; B29C 65/08; B29C 66/41; B29C 65/7443; B29C 65/086; B29C 66/816; F16C 32/0603; F16C 32/0402; F16C 32/0427; F16C 39/06–39/066; H02K 7/09
USPC .......... 269/8; 72/430, 707; 310/90.5; 384/50, 384/56, 57
See application file for complete search history.

(56) References Cited

U.S. PATENT DOCUMENTS 3,312,134 A   4/1967   Roney et al.
6,164,360 A   12/2000  Watrinet et al.
(Continued)

FOREIGN PATENT DOCUMENTS

DE    31 46 585 A1   6/1983
DE    248 849 A5     8/1987
(Continued)

OTHER PUBLICATIONS

English Translation of International Search Report issued in German Patent Application No. 10 2011 121 830.4 on Sep. 7, 2012, 13 pages.
(Continued)

*Primary Examiner* — Monica Carter
*Assistant Examiner* — Nirvana Deonauth
(74) *Attorney, Agent, or Firm* — Kilpatrick Townsend & Stockton LLP

(57) ABSTRACT

An anvil for ultrasonic machining includes an air-supported support part which is floatingly supported via an air bearing at a carrier part, wherein the support part and the carrier part are connected to one another via at least one linear guide.

15 Claims, 2 Drawing Sheets

(51) Int. Cl.
  *B29C 65/08* (2006.01)
  *B29C 65/74* (2006.01)
  *B29C 65/00* (2006.01)
  *F16C 32/04* (2006.01)
  *F16C 32/06* (2006.01)

(56) References Cited

U.S. PATENT DOCUMENTS

| | | | |
|---|---|---|---|
| 6,366,190 B1 * | 4/2002 | Fujita et al. | 335/285 |
| 6,838,967 B2 * | 1/2005 | Martin | 335/306 |
| 7,557,905 B2 * | 7/2009 | Heo | 355/72 |

FOREIGN PATENT DOCUMENTS

| | | |
|---|---|---|
| DE | 39 21 653 A1 | 1/1991 |
| DE | 41 05 013 A1 | 8/1992 |
| DE | 4105013 A1 | 8/1992 |
| DE | 19607401 A1 | 9/1996 |
| DE | 198 09 581 A1 | 9/1999 |
| DE | 19837124 C1 | 11/1999 |
| DE | 199 17 133 A1 | 11/2000 |
| DE | 103 31 064 A1 | 2/2005 |
| DE | 10 2004 013 049 A1 | 9/2005 |
| DE | 10 2006 020 429 A1 | 10/2007 |
| DE | 10 2007 035 793 A1 | 1/2009 |
| EP | 1849569 A2 | 10/2007 |
| JP | 2004330622 A | 11/2004 |

OTHER PUBLICATIONS

Extended European Search Report mailed Mar. 18, 2013 in Application No. EP12196874.7.

* cited by examiner

ANVIL FOR ULTRASONIC MACHINING

This application claims priority to German Application No. 10 2011 121 830.4, filed Dec. 21, 2011, the disclosure of which is incorporated by reference herein.

The present invention relates to an anvil for ultrasonic machining, for example for ultrasonic cutting, ultrasonic welding or also ultrasonic separation welding.

If very thin materials, for example films, are processed using such processing methods, the problem can arise that the ultrasonic vibration applied by an ultrasonic apparatus, for example a sonotrode, is introduced predominantly into the anvil, i.e. into the workpiece support, but not into the film and that an irregular machining takes place due to a minimal misalignment of the workpiece support.

It is therefore the underlying problem of the invention to provide an anvil for ultrasonic machining with which even very thin materials can be properly machined.

This object is satisfied by the features of claim 1 and in particular by an anvil for ultrasonic machining which includes an air-supported support part which is floatingly supported at a carrier part via an air bearing, wherein the support part and the carrier part are connected to one another via at least one linear guide and wherein at least one permanent magnet is provided which generates a repulsion force between the support part and the carrier part to form the air bearing.

Trials have shown that a very good decoupling between the carrier part and the support part is possible by the apparatus in accordance with the invention so that a vibration amplitude of the carrier part was no longer measurable on operation of the ultrasonic apparatus with several 10 kHz. The wear of the support parts is minimized by use of the air bearing and the decoupling between the carrier part and the support part is optimized. At the same time, a self-aligning support results with which an almost perfect parallelism of the support part can be achieved relative to a tool which is incident relative to the workpiece support.

Since the support part and the carrier part are connected to one another via at least one linear guide, a floating support of the two parts is ensured and both parts are separated from one another via the air bearing to effect a good vibration decoupling. Since the air bearing has a permanent magnet, no electrical supply is required.

Advantageous embodiments of the invention are described in the description, in the drawing and in the dependent claims.

In accordance with a first advantageous embodiment, at least one permanent magnet is respectively arranged in the support part and in the carrier part such that the like poles of the two permanent magnets face one another. In this manner, a high repulsion effect is maintained within the air bearing by magnetic force. At the same time, such an apparatus can be manufactured inexpensively, simply and fast.

It can be advantageous to configure the air bearing so that a plurality of spatially resolved support points, i.e. discrete support points are present, which are spatially spaced apart from one another in particular to obtain constant pressure relationships with a large width of the workpiece to be machined and on the setting of a tool toward the anvil over the total length or surface of the machining which takes place In accordance with a further advantageous embodiment, a bearing element of the air bearing can be integrated in the support part and in the carrier part respectively. For example, the support part and the carrier part can each be provided with a cut-out, for example with a blind bore or the like in which parts of the air bearing are arranged. A more compact and lightweight design results in this manner.

It can be advantageous to provide the support part and/or the carrier part with at least one magnet package. The possibility hereby results to vary the forces to be taken up within the air bearing in that the components of the magnet package are varied.

In accordance with a further advantageous embodiment, magnets of the air bearing are supported in a vibration decoupled manner, i.e. the magnets arranged in the support part and in the carrier part are not rigidly connected to the respective part, but rather have a damped support. It was namely found that a depolarization of the magnets can occur under specific operating conditions if they are exposed to vibrations in the ultrasonic range over a longer time. In accordance with the invention, the magnets used can, therefore, for example be cast into a plastic composition so that a vibration decoupling takes place by this plastic composition.

In accordance with a further advantageous embodiment, the support part can be guided in a cut-out of the carrier part. A compact arrangement hereby results in which additional guides between the support part and the carrier part can be dispensed with since the margins of the cut-out can be used as a guide.

It can be advantageous if the linear guide includes at least two parallel linear ball bearings since in this case a tilt-free guide of the support part is ensured.

In accordance with a further advantageous embodiment, the support part can include an adjustable anvil wheel. Such an adjustable anvil wheel can be somewhat rotated after a certain operating time if a wear at the surface of the anvil wheel has appeared.

In accordance with a further advantageous embodiment, the air bearing at the carrier part and at the support part can include an equal number of a plurality of permanent magnets. In this manner, the repulsion forces between the support part and the carrier part can be homogenized, on the one hand. On the other hand, the repulsion force between the support part and the carrier part can be increased and also set if a plurality of pairs of permanent magnets are provided.

It can be advantageous for a tilt-free guidance of the support part at the carrier part if a plurality of permanent magnets are arranged in a row.

In accordance with a further advantageous embodiment, the support part and the carrier part are each formed in the manner of a plate. In this manner, a very advantageous support is ensured which precludes a tilting of the support part with respect to the carrier part. A particularly compact arrangement can be achieved in that the support part and the carrier part are arranged in coplanar form. If the permanent magnet or the permanent magnets are arranged so that the repulsion force extends parallel to the plane of the plates, a stably guided air bearing can be achieved with the aid of only two lateral linear guides.

The support part and/or the carrier part can be formed in accordance with the invention from non-magnetizable material, for example from aluminum, titanium or also plastic. Alternatively, it is also possible to design the support part and/or the carrier part as a magnetic plate or as a magnetic element.

The present invention will be described in the following purely by way of example with reference to advantageous embodiments and to the enclosed drawing.

Figure 1:
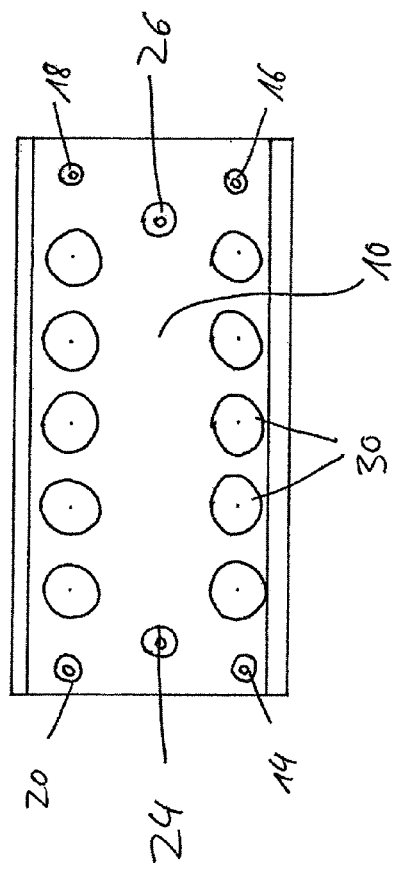
FIG. 1 shows a plan view of an anvil for ultrasonic machining.
Figure 3:
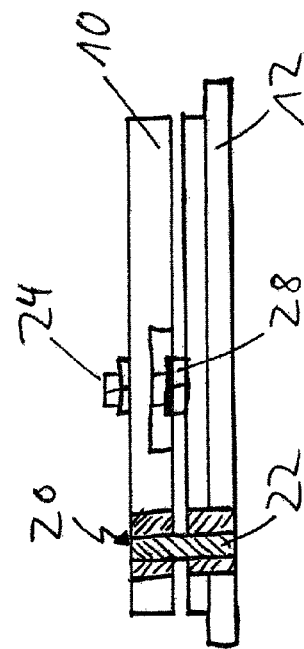
FIG. 3 shows a partly sectioned side view of the anvil of FIGS. 1 and 2.
Figure 2:
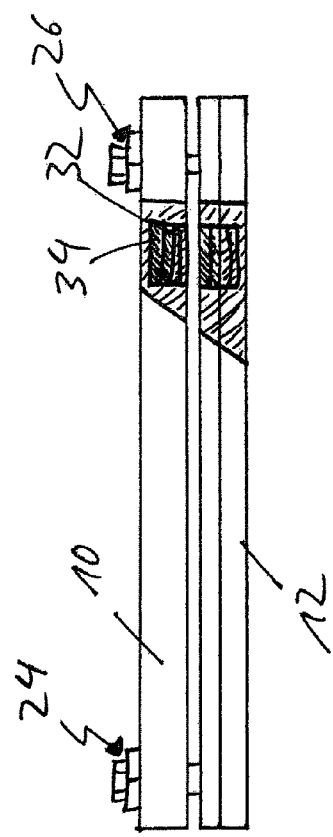
FIG. 2 shows a partly sectioned side view of the anvil of FIG. 1.

The embodiment of an anvil for ultrasonic machining shown in FIGS. 1-3 includes an upper (in FIGS. 2 and 3) support part 10 with an upper support surface said support part being floatingly supported via an air bearing at a support part 12 (a lower support part in FIGS. 2 and 3). Both the support part 10 and the carrier part 12 are designed in the manner of plates and substantially rectangular in a plan view. The support surface can be formed as planar or curved. To prevent any canting of the support part 10 with respect to the carrier part 12 and to allow a self-aligning support, linear guides 14, 16, 18 and 20 are arranged in the respective corners of the workpiece support. Each linear guide includes a bolt 22 which is screwed into the support part 12 and which is provided in its upper section with a cylindrical shaft section which is inserted with low clearance into a bore of the support part. In this manner, the support part 10 can be displaced in a direction parallel to the axis of the bolt 22 relative to the carrier part 12, with a rotating or a canting being precluded.

To connect the support part 10 and the carrier part 12 captively (i.e. in an unlosable manner) to one another and in so doing simultaneously to allow a decoupled movement of the support part 10 relative to the carrier part 12, two bolts 24 and 26 are screwed into the carrier part 12 in the center of the narrow sides and are led through the support part 10 and are locked by nuts 28 in the carrier part 12.

The above-described air bearing includes a total of ten bearing elements 30 arranged spaced apart from one another in the embodiment shown, with one or the bearing elements being able to be recognized in the longitudinal section of FIG. 2. Each bearing element 30 is accordingly formed by two magnet packages 32 and 34, with each magnet package being arranged in a cut-out of the support part or of the carrier part of blind hole form and thereby being integrated into the respective part.

In the embodiment shown, each magnet package 32, 34 comprises a total of four disk-shaped magnetic plates which are bonded or clamped or otherwise fixed into the cut-out in the support part 10 or in the carrier part 12. In this respect, the individual magnetic plates of a package are arranged so that respective opposite poles come to lie on one another. The two magnet packages 32 and 34 are, however, arranged in the support part 10 and in the carrier part 12 so that their like poles face one another.

In other words, the two magnet packages 32 and 34 repel one another and thereby form the air bearing element 30.

As illustrated in the plan view of FIG. 1, the air bearing of the embodiment shown includes two parallel rows of air bearings 30 which are each arranged along the longitudinal sides and which each include five bearing elements 30, with each bearing element including a magnet package 32 and a magnet package 34.

The sectioned representations of FIGS. 2 and 3 allow it to be recognized that there is always an air gap between the support part 10 and the carrier part 12 in the installed state and that this air gap is also present between the respective magnet packages. In this manner, a good self-aligning support with exceptional decoupling is ensured.

Figure 4:
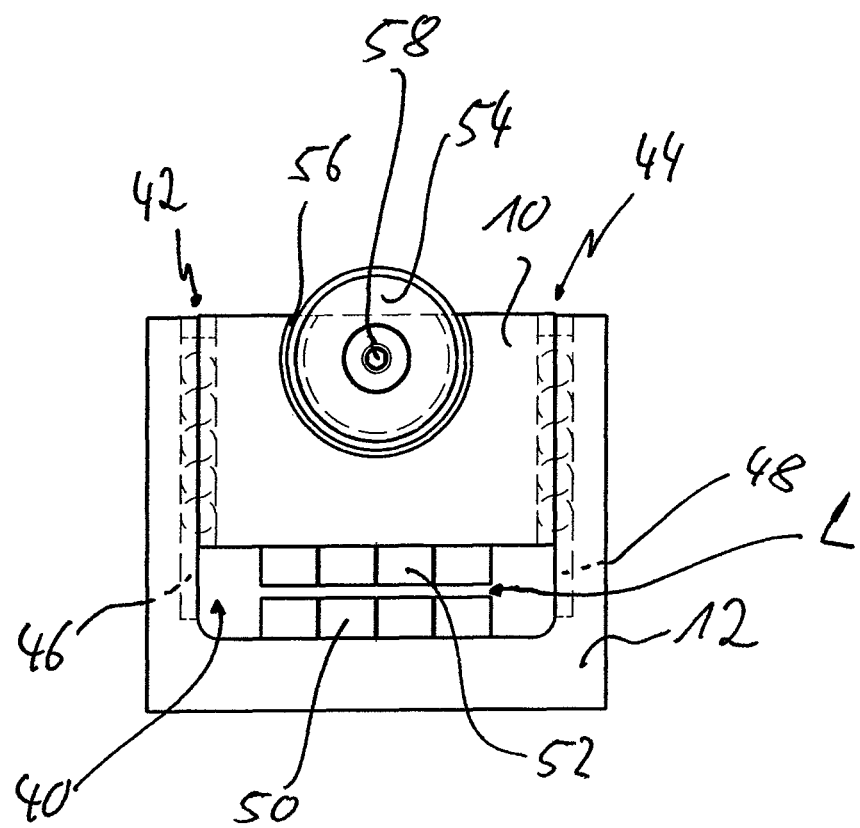
FIG. 4 shows a side view of a further embodiment of an anvil.

FIG. 4 shows a further embodiment of an anvil for ultrasonic machining, with the same reference numerals being used for the same components.

The anvil shown in FIG. 4 in turn has an air-supported support part 10 which is floatingly supported at a carrier part 12 via an air bearing. Both the support part and the carrier part are formed as plate-like components and have approximately the same thickness. The carrier part 12 is provided with an upwardly open U-shaped recess 40 for guiding the support part 10 in the carrier part 12. Furthermore, the support part 10 and the carrier part 12 are connected to one another via two parallel linear guides 42 and 44, with each linear guide 42 and 44 including a linear ball bearing. Channel-like grooves 46 and 48 are respectively provided in the support part 10 and in the carrier part 12 for guiding the individual balls of the two ball bearings.

The substantially parallelepiped-shaped support part 10 has approximately ⅔ of the height of the support part 12 so that a free space remains, in which bearing elements of the air bearing are provided, within the recess 40 between the lower side of the support part 10 and the upper side of the carrier part 12. In the embodiment shown, the bearing elements of the air bearing include two parallel rows of individual permanent magnets 50 and 52 which are orientated so that a repulsion force is produced between the two rows of permanent magnets to form the air bearing. The permanent magnets 50, which are fastened to the carrier part 12, and the permanent magnets 52, which are fastened to the support part 10, are thus arranged such that their like poles each face one another. An air gap L is hereby formed between the two rows of permanent magnets 50 and 52.

The permanent magnets 50 and 52 can be exchangeably fastened to the support part 10 and the carrier part 12 so that the repulsion force can be set between these two components. The permanent magnets can in this respect be countersunk, partly integrated, bonded or wedged in the components.

For supporting an adjustable anvil wheel 54, the support part 10 has an approximately circular recess 56 which is open upwardly and to a side of the receiving part 10. The anvil wheel 54 is adjustably fastened in this recess via a fastening screw 58 and the outer periphery of the anvil wheel 54 projects beyond the support part 10. The anvil wheel can hereby serve as a counter-support for the sonotrode and can be somewhat rotated after a discovered wear at the anvil wheel.

In the embodiment shown in FIG. 4, the plate-like support part 10 and the likewise plate-like carrier part 12 are arranged at least substantially coplanar so that a compact and symmetrical design is present. The repulsion force of the permanent magnets extends in this respect parallel to the plane of the plate-like components 10 and 12 so that a stable and tilt-safe guidance of the support part 10 is provided with only two linear guides 42 and 44.

The invention claimed is:

1. An anvil for ultrasonic machining, comprising: a plate-shaped carrier part; an air-supported, plate-shaped support part which is floatingly supported via an air bearing at the carrier part; at least one first linear guide having a first end coupled to the support part and a second end coupled to the carrier part, wherein the support part and the carrier part are connected to one another via the first linear guide; at least one second linear guide configured for a stable guidance of the support part and configured to preclude tilting of the support part; and two parallel rows of permanent magnets which produce a repulsion force between the support part and the carrier part to form the air bearing.

2. The anvil of claim 1, wherein each of a first subset of the permanent magnets is disposed in the support part and each of a second subset of the permanent magnets is disposed in the carrier part, such that like poles of the first subset and the second subset face one another.

3. The anvil of claim 1, wherein the permanent magnets are integrated into the support part and the carrier part.

4. The anvil of claim 1, wherein each of the support part and the carrier part comprises at least one cut-out in which the permanent magnets are disposed.

5. The anvil of claim 1, wherein the permanent magnets are magnet packages.

6. The anvil of claim 1, wherein the support part is guided in a recess of the carrier part.

7. The anvil of claim 1, wherein the linear guide comprises at least two parallel linear ball bearings.

8. The anvil of claim 1, wherein the support part comprises an adjustable anvil wheel.

9. The anvil of claim 1, wherein the permanent magnets are provided in an equal number at the carrier part and at the support part.

10. The anvil of claim 9, wherein the two parallel rows of permanent magnets comprise a first row of permanent magnets is at the carrier part and a second row of permanent magnets at the support part.

11. The anvil of claim 9, wherein the repulsion force between the support part and the carrier part can be is set by selecting the number of permanent magnets.

12. The anvil of claim 1, wherein the support part and the carrier part are coplanar.

13. The anvil of claim 1, wherein the repulsion force is parallel to the plane of the plates.

14. An anvil for ultrasonic machining, said anvil comprising an air-supported support part which is floatingly supported via an air bearing at a carrier part, wherein the support part and the carrier part are connected to one another via at least one linear guide, wherein the linear guide includes at least two parallel linear ball bearings, and wherein at least one permanent magnet is provided which produces a repulsion force between the support part and the carrier part to form the air bearing.

15. An anvil for ultrasonic machining, comprising:
a carrier part;
an air-supported support part which is floatingly supported via an air bearing at the carrier part;
at least one linear guide, wherein the support part and the carrier part are connected to one another via the linear guide, wherein the linear guide comprises at least two parallel linear ball bearings; and
at least one permanent magnet which produces a repulsion force between the support part and the carrier part to form the air bearing.

* * * * *